United States Patent [19]

Juraschek et al.

[11] Patent Number: 4,623,188
[45] Date of Patent: Nov. 18, 1986

[54] HEIGHT ADJUSTABLE SUN VISOR FOR AUTOMOTIVE VEHICLES

[75] Inventors: Peter Juraschek, Wuppertal; Manfred Nowak, Solingen, both of Fed. Rep. of Germany

[73] Assignee: Gebr. Happich GmbH, Fed. Rep. of Germany

[21] Appl. No.: 665,778

[22] Filed: Oct. 29, 1984

[30] Foreign Application Priority Data

Nov. 17, 1983 [DE] Fed. Rep. of Germany ....... 3341509

[51] Int. Cl.⁴ ............................................... B60J 3/02
[52] U.S. Cl. .................................. 296/97 G; 296/97 H
[58] Field of Search ................ 296/97 G, 97 R, 97 H, 296/97 B, 97 K, 97 C; 297/410; 160/DIG. 3; 362/135, 137, 142

[56] References Cited

U.S. PATENT DOCUMENTS 2,526,889 10/1950 McComb ........................... 296/97 G
2,733,763 2/1956 Nygaard ............................ 296/97 G
3,512,832 5/1970 Kage .................................. 297/410

FOREIGN PATENT DOCUMENTS 2258005 5/1974 Fed. Rep. of Germany .
2400784 7/1975 Fed. Rep. of Germany .
3013800 4/1980 Fed. Rep. of Germany .... 296/97 B
1362640 7/1966 France ............................... 296/97 G
0707089 5/1966 Italy .................................... 296/97 G Primary Examiner—Robert B. Reeves
Assistant Examiner—Carol L. Olson
Attorney, Agent, or Firm—Ostrolenk, Faber, Gerb & Soffen

[57] ABSTRACT

A sun visor for an automotive vehicle has a generally flat visor body of approximately rectangular contour. It is separated into an upper part and a lower part which are movable along guide pins toward and away from each other effectively lengthening or shortening the height of the visor body. Pins projecting from the lower edge of the upper part are received in pin receivers opening at the upper edge of the lower part, so that the upper part and lower part may be moved together and apart. A tongue-like extension projects from one side surface or from both side surfaces of the upper part down past the corresponding side surface of the lower part, and the extension is of a length so that when the upper and lower parts are separated, the tongue-like extension covers the gap between them.

17 Claims, 11 Drawing Figures

HEIGHT ADJUSTABLE SUN VISOR FOR AUTOMOTIVE VEHICLES

BACKGROUND OF THE INVENTION

The present invention relates to a sun visor for automotive vehicles and more particularly to the height adjustment feature of the sun visor. A sun visor consists essentially of a plate-shaped sun-visor body of approximately rectangular contour, which has a longitudinal edge zone with an embedded mounting shaft that extends approximately parallel to that edge of the sun-visor body. The sun-visor body is swingably mounted on that shaft.

Cars are customarily provided with sun visors which can be swung down to their use position. The visors are arranged at the upper edge of the windshield and are swung down to cover the upper portion of the windshield when needed. Sun visors are of only limited utility since they are capable only of covering the upper portion of the windshield. Known sun visors are not tall enough to protect sufficiently against the rays of a very low sun, to protect against driver dazzle, such as is frequently present in the early morning and evening hours and when climbing hills.

Federal Republic of Germany published application DE-OS No. 24 00 784 describes a sun visor in which the region of protection against dazzle can be extended downward by a supplementary visor body which is pivotally attached to the lower longitudinal edge of the main sun-visor body. The supplementary visor body, however, subsantially increases the cost of the sun visor and when swung down, it can also constitute a considerable obstacle to the vision of the driver of the vehicle.

Federal Republic of Germany Application DE-OS No. 22 58 005 shows a sun-visor body with a pocket-shaped cutout which is open at its lower edge. Within the cutout, there is a dazzle protection shield, which can be pulled downward. This increases the region of protection against dazzle that can be afforded by the sun-visor body when it is in the downward direction. As has been shown by tests, however, such a sun visor is not practical. In particular, it is difficult to slit the sun-visor body practically over its entire length and width and to guide the dazzle-protection shield so it will be free of canting within the slit.

SUMMARY OF THE INVENTION

The object of the invention is so to improve a sun visor of the aforementioned type for it to be simple and economical to manufacture and to afford reliable protection against dazzle, even in the case of a low sun, and without the use of a supplementary visor body or of an additional dazzle protection shield of the type described above.

According to the invention, the sun-visor body comprises an upper part, which carries a mounting shaft, and a lower part, which is displaceable on guide elements extending generally perpendicular to the mounting shaft of the visor for permitting the lower part of the visor to be displaced away from or toward the upper part.

By developing the sun-visor body in two parts and by connecting the two parts so that they are movable relative to each other, it is possible to both swing the sun-visor body as a whole in the traditional manner in front of the windshield and to displace its lower part to obtain optimum protection against dazzle. However, the dazzle-protection region provided by the sun-visor body is not necessarily increased by the invention but instead it is primarily shifted in case of need.

The guide elements include at least one pin in the upper or lower part of the visor and at least one pin receiver in the other of the upper and lower parts, and with the pin being arranged telescopically within the pin receiver. The pin is preferably displaceable stepwise, in a ratchet-like manner, within the pin receiver. The pin and pin receiver form a guidance device which, on the one hand, is simple and economical to produce and, on the other hand, is characterized by good, maintenance-free operation. It is preferable, but not required, to define the guidance device of two pins and two pin receivers.

In a preferred embodiment, the upper part is substantially shorter in height than the lower part and carries at least one pin projecting from its lower edge and projecting into a pin receiver incorporated in and opening at the upper edge of the lower part. In this way, the upper part of the visor performs the tasks of holding the mounting shaft and supporting the lower part.

In an advantageous further development, at least one of the upper and lower parts, and preferably the upper part, of the visor has, at least on one of its outer side surfaces, a tongue-like extension which extends at least over a part of the height of the side of, and overlaps the other lower part of the visor on its corresponding outer side surface. The extension extends parallel to the pin. The length of the overlap corresponds at least to the greatest possible path of displacement of the lower part of the visor relative to the upper part. In this way, when the lower part is pulled down from the upper part, the gap produced between the parts is covered so that no dazzling rays can enter the car through such gap. As a further result of this measure, the effective dazzle-protection region of the sun-visor body is not only shifted downward but is also increased. This latter factor is of importance, in particular, for shorter drivers since they can individually adjust the dazzle-protection region of the sun-visor body to their own needs.

Furthermore, the one outer surface of the lower part can have at least a step-shaped thickness reduction corresponding to the dimensions of the extension from the upper part in order to achieve equalization in thickness. This primarily imparts a pleasing appearance to the sun visor.

For simple and economical manufacture of the sun visor, it is advantageous for the upper part to comprise a plastic injection molding and for the lower part to be a cushioning body with a reinforcing insert and with at least one pin receiver incorporated in it. It is further advantageous for the upper part, which comprises a mounting receiver for the mounting shaft, the tongue-shaped extension, the pin and possibly the outer-support shaft, to be entirely made of a single piece of the same material, for obtaining economical manufacture.

The sun visor of the invention can be supplemented by providing its upper part with a recess containing a source of light, which is adapted to be electrified by the electrical system of the car. A lens covers the light. The lower part of the visor supports a mirror which is arranged within a respective recess and near the light.

Other objects and features of the invention will be explained below with reference to the accompanying drawings.

BRIEF DESCRIPTION OF THE DRAWINGS

FIG. 4 is an elevational view of a second embodiment of a sun visor, with its lower part pulled down;

FIG. 5 is an end view of the sun visor of FIG. 4;

FIG. 6 is an end view of the sun visor of FIG. 4; seen with the lower part pushed up and resting against the upper part;

FIG. 7 is an end view of a third embodiment of a sun visor;

DESCRIPTION OF THE PREFERRED EMBODIMENTS

Figure 1:
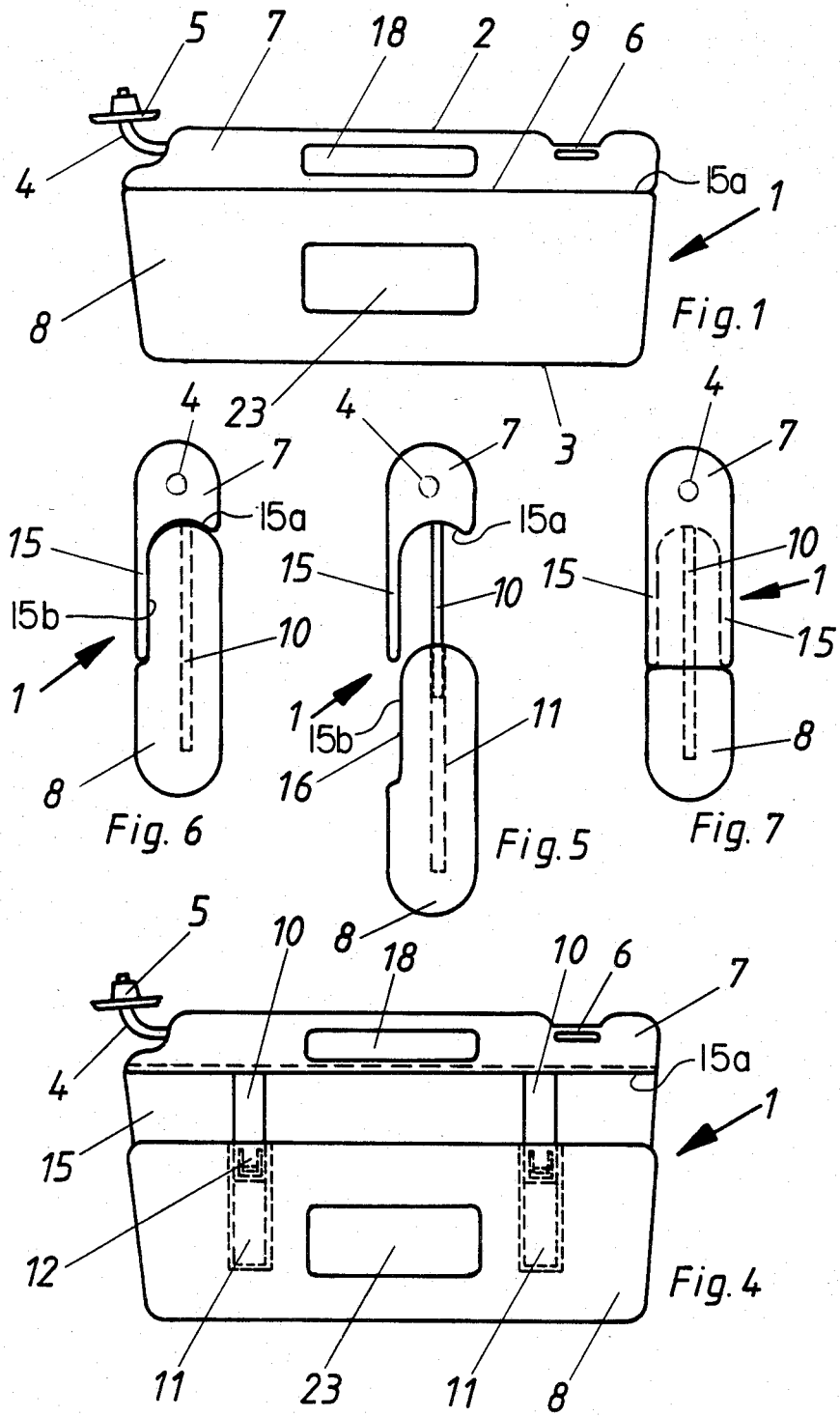
FIG. 1 is an elevational view of a complete sun visor provided with the invention.

The sun visor shown in FIG. 1 comprises a sun-visor body 1 having an upper longitudinal edge 2 and a lower longitudinal edge 3 which extend at least approximately parallel. In its upper longitudinal edge zone, the sun-visor body 1 has a mounting shaft 4, which is incorporated within and extends approximately parallel to the longitudinal edge 2. The end region of the shaft 4 emerging from the left end of the sun-visor body 1 in FIG. 1 is bent at an angle and is arranged within a mounting housing 5 which, in its turn, is fastened to the car body (not shown). At the end region facing away from the mounting shaft 4, the upper longitudinal edge zone of the sun-visor body 1 has an outer-support shaft 6 which is aligned with the axially extending portion of the mounting shaft 4 that is located within the sun-visor body 1. The outer-support shaft 6 is detachably connected to an outer-support housing (not shown) adapted to be fastened to the body of the car. The sun-visor body 1 can be swung about the mounting shaft 4 from a position of non-use, wherein the visor is directed approximately parallel to the roof of the car, into a position of use, wherein it is directed approximately parallel to the windshield. It can also be swung toward the adjacent side window of the car, since the bent arm of the mounting shaft 4 is mounted in a rotatable manner within the mounting housing 5.

The sun-visor body 1 is comprised of two main parts, namely the upper part 7 and the lower part 8. These are connected to each other for relative displacement in the height direction of the visor, perpendicular to the axial extension of the mounting shaft 4 and perpendicular to the longitudinal edges 2 and 3, and generally in the plane of the visor. The connection is through guide elements, which are described below. The line of separation 9 between upper part 7 and lower part 8 of the visor extends parallel to the longitudinal edges 2 and 3. This two part development of the sun-visor body 1 enables the lower part 8 to be shifted downward in the position of use of a sun-visor body 1 and to thereby screen off the rays of the low sun. Since the lower part 8 of the visor serves primarily for dazzle-protection and the upper part 7 primarily serves a support function, the lower part 8 is substantially taller between its longitudinal edges than the upper part 7.

Figure 2:
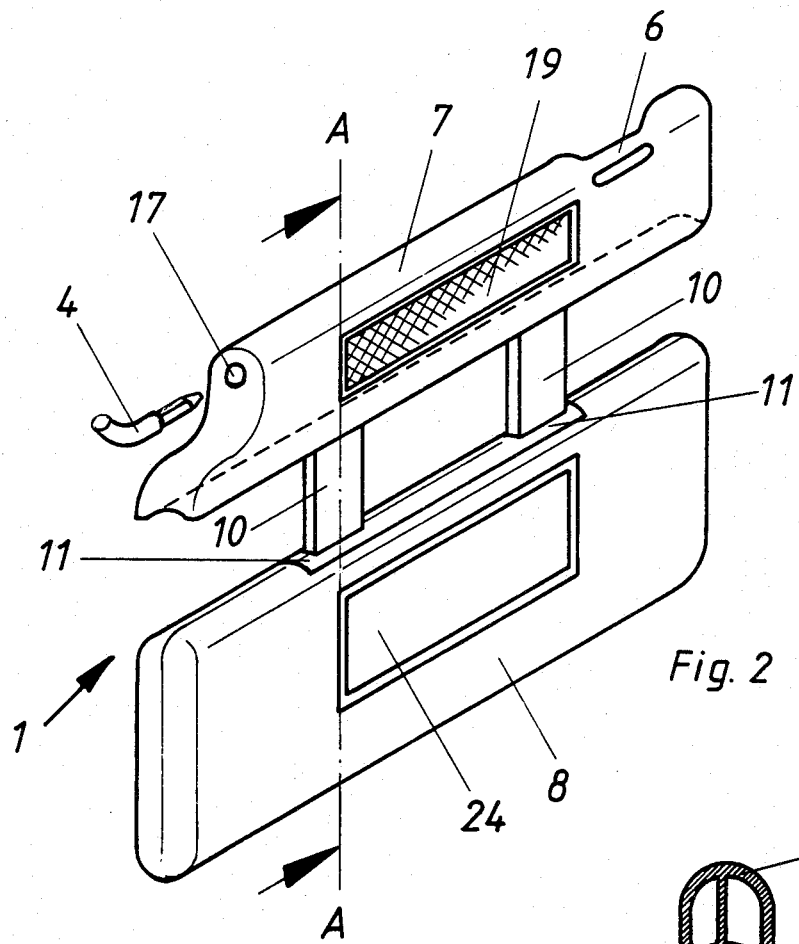
FIG. 2 is a perspective view showing the sun visor of FIG. 1 with the lower part of the sun-visor body pulled down from the upper part.
Figure 3:
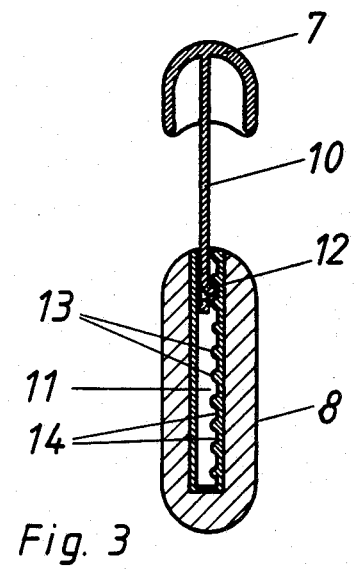
FIG. 3 is a section along the line A—A of FIG. 2.

FIGS. 2 and 3 show a first embodiment of the sun visor. The sun-visor body 1 comprises the upper part 7, the lower part 8 and two pins 10 which connect the parts 7 and 8 to each other. The pins 10 are rigidly attached to and extend down from the lower edge of the upper part 7. The pins are telescopically received in separate pin receivers 11 incorporated in the lower part 8 and which open toward the pins. The distance from the pins 10 to the longitudinal center of the sun-visor body 1 may be approximately the same as the distance from those pins to the ends of the sun-visor body 1. The pins 10 are developed as columns of rectangular cross section. But, it is also possible to provide a different cross-sectional shape, such as a round shape.

In FIG. 3, the pin 10 has an outwardly jutting spring tongue 12 at the region of its end. The pin receiver 11 has a cooperating rack profile with teeth 13 and tooth gaps 14. The rack profile cooperates in ratchet-like manner with the spring tongue 12. In this way, fine-stepping displacement of the lower part 8 relative to the upper part 7 can be obtained.

FIG. 4 shows that each spring tongue 12 comprises a tab which is cut free on three sides and has its free end bent outward. Also, a friction brake may be provided between the pin 10 and the pin receiver 11, thus making the lower part 8 continuously adjustable.

FIGS. 4 to 9 show sun visor embodiments which have been improved as compared with that of FIGS. 2 and 3 in that when the lower part 8 of the visor body is pulled down, there is no slot between the upper part 7 and the lower part 8 which would permit the entrance of light. In order to achieve this, on the outside surface of the upper part 7 and extending over its width, there is a tongue-shaped extension 15 which extends parallel to the pins 10 and overlaps the lower part 8. Extension 15 extends from intermediate edge 15a of upper part 7 and overlaps at least a portion 15b of lower part 8 when the lower part 8 is in a retracted position as depicted in FIG. 6. The length or height of that extension is sufficient that even when the lower part 8 of the visor is pulled down, no gap which permits the passage of light can be produced. The corresponding outer surface of the lower part 8 is provided with a thickness equalizing, step-shaped recess 16, which corresponds to the thickness and height of the extension 15, whereby the extension rests in the recess. In the embodiment of FIG. 7, the upper part 7 has two downwardly extending tongue-shaped extensions 15 on its inward and outward surfaces, and the bottom part 8 has two corresponding step-shaped recesses to receive them.

Figure 8:
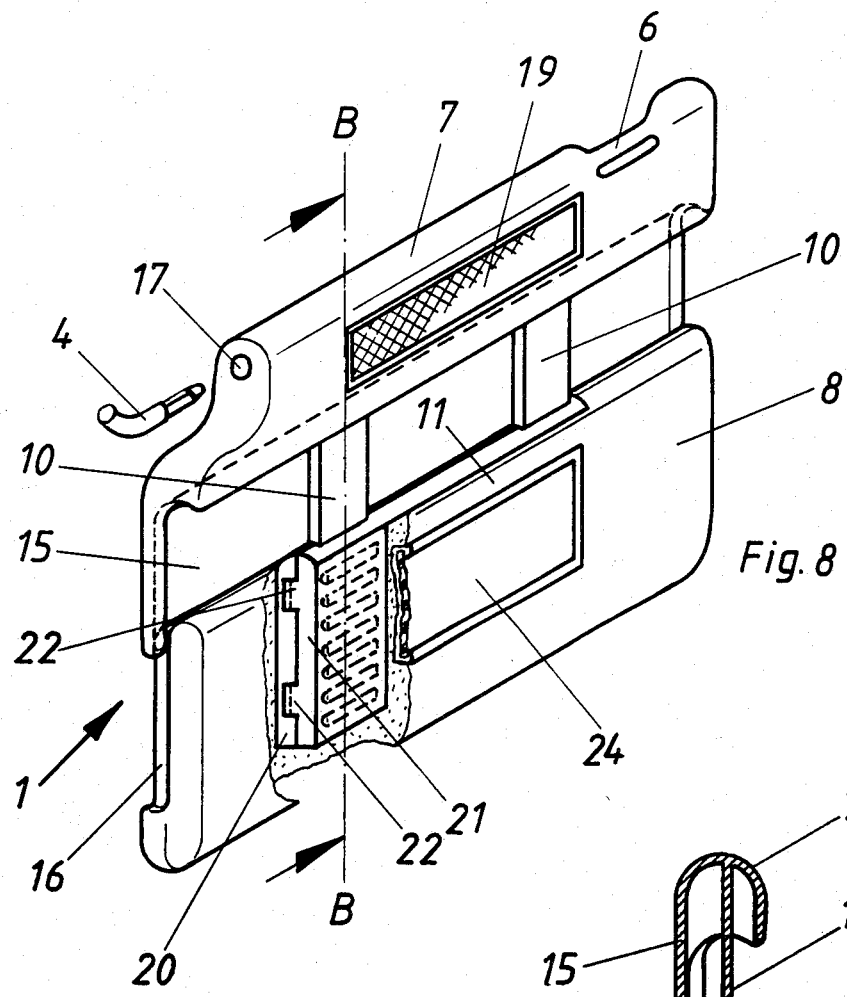
FIG. 8 is a perspective view of the sun visor embodiment of FIG. 4, partially broken away.
Figure 9:
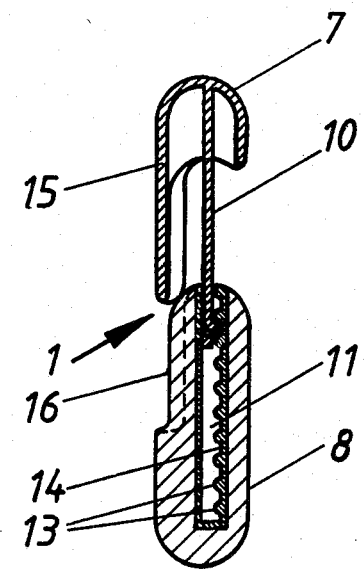
FIG. 9 is a cross-sectional view along the line 9—9 of FIG. 8.

As can be noted in particular from FIG. 8, all edge regions of the sun-visor body 1, those of the upper part 7 and of the lower part 8, are softly rounded, and thus satisfy safety requirements.

The upper part 7 of the sun visor is a plastic injection molding including integrally formed mounting receiver 17, the outer-support shaft 6, the pins 10, the extension 15 and, preferably, also a recess 18 to receive a source of electric light and a lamp cover 19. The light may be an ordinary incandescent bulb or a tubular bulb. Electricity for energizing the source of light can be provided by two electric wires of the electrical system of the car, and these are passed, for instance, through the visor mounting shaft. The source of light and the electric wires are not shown in detail.

The lower part 8 of the visor is a cushioning body, which may be stiffened by a reinforcing insert and which incorporates the pin receiver 11. The pin receiver 11 comprises a structural part which guides both of the pins 10. It is formed of two half shells 20, 21, each developed as a plastic injection molding, and the shell halves are held together by clip elements developed on them. The lower part 8 has a recess 23 with a mirror 24 inserted in it. The mirror can also be used in the dark because of the illumination from the source of light arranged in the upper part 7.

It is readily possible to provide the upper part 7 with a covering flocking layer or else with a covering of plastic foam, or the like.

Provision is made to prevent the lower part 8 from being unintentionally removed completely from the upper part 7. Means for this may, for instance, comprise spring tongues (not shown) developed on one half shell for acting against the pins. The latter tongues prevent the spring tongues 12 of the pins 10 from moving backward when the lower part 8 has reached a given length of extension.

Figure 6A:
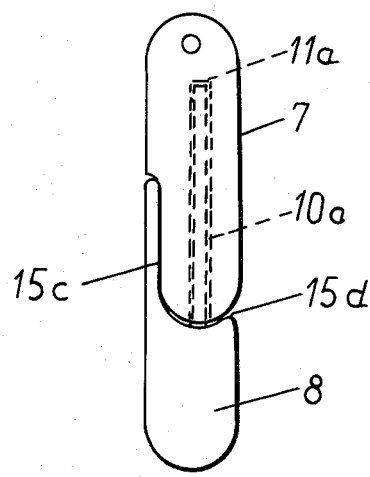
FIGS. 6a and 6b are end views of the present invention which is an alternative embodiment to the arrangement shown in FIG. 6.
Figure 6B:
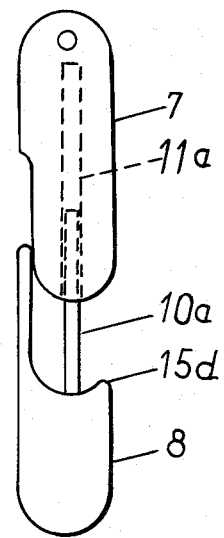

Although the embodiments, shown in FIGS. 4-9, include tongue-like extension 15 on upper part 7, the simple modification of providing extension 15 on lower part 8 as illustrated in FIGS. 6a and 6b is also contemplated. Thus, in FIG. 6a, upper part 7 and lower part 8 are in a retracted position while in FIG. 6b they are in an extended position. Note that extension 15c extends from lower part 8 starting at an intermediate edge 15d. Pin 10a is affixed in this case to lower part 8 and extends into channel 11a in upper part 7.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A sun visor for vehicles having a sun visor body of a flat shape and a substantially rectangular peripheral contour;
    the said sun visor body consisting of two flat parts including an upper part and a lower part;
    both the upper part and the lower part having an upper longitudinal edge and a lower longitudinal edge, all of said edges extending parallel to each other;
    the upper part having in the region of its upper longitudinal edge a support shaft which extends substantially parallel to said upper longitudinal edge and, in the region of an intermediate longitudinal edge, a flat tongue portion extending in the plane of the upper part;
    the lower longitudinal edge of the upper part being adjacent to the upper longitudinal edge of the lower part when in an extended position, said tongue portion overlapping a portion of said lower part when in a retracted position;
    guide means between the upper part and the lower part making it possible to pull the lower part downwardly away from the upper part and move it upwardly toward the upper part as desired;
    the guide means comprising at least one pin which supported by the upper part and extends beyond the lower longitudinal edge of said upper part;
    a pin receiver incorporated in said lower part and open on the upper edge of the lower part, the thickness of said pin being less than that of the lower part whereby said pin is receivable within and slidable relative to said lower part.

2. The sun visor of claim 1, wherein a plurality of pins are provided on the upper part, and the plurality of pin receiving openings are provided on the lower part, said pin receiving openings being in close frictional engagement with said pins.

3. A sun visor for vehicles having a sun-visor body of a flat shape and a substantially rectangular peripheral contour;
    the said sun visor body comprising two flat parts including an upper part and lower part;
    both the upper and the lower part having an upper longitudinal edge and a lower longitudinal edge, all of said edges extending parallel to each other;
    the upper part having in the region of its upper longitudinal edge a support shaft which extends substantially parallel to said upper longitudinal edge;
    the lower longitudinal edge of the upper part being adjacent to the upper longitudinal edge of the lower part;
    the lower part having in the region of an intermediate longitudinal edge thereof a flat tongue portion extending in the plane of the lower part, the tongue portion overlapping a portion of said upper part when said sun visor is in a retracted position;
    guide means between the upper part and the lower part making it possible to pull the lower part downwardly away from the upper part and move it upwardly toward the upper part as desired;
    the guide means comprising at least one pin which is supported by the lower part and extends beyond the lower longitudinal edge of said upper part;
    a pin receiver incorporated in said upper part and open on the lower edge of the upper part, the thickness of said pin being less than that of the upper part whereby said pin is receivable within and slidable relative to said upper part.

4. The sun visor of claim 1, wherein the mounting shaft extends approximately parallel to the upper edge zone and the visor body being swivelable about the mounting shaft; the lower part being displaceable in a direction generally perpendicular to the mounting shaft.

5. The sun visor of claim 1, further comprising stepwise, ratchet-like means on the pin and in the pin receiver for permitting step-wise movement of the pin into and out of the pin receiver and for fixing the pin at selected locations along the pin receiver.

6. The sun visor of claim 1, wherein the pin and pin receiver extend generally in the plane of the sun-visor body.

7. The sun visor of claim 1, wherein the pin is defined in the upper part and the pin receiver is defined in the lower part.

8. The sun visor of claim 1, wherein the height of the upper part between the one longitudinal edge zone and the lower edge thereof is substantially shorter than the height of the lower part between the upper edge zone part and the opposite edge zone thereof.

9. The sun visor of claim 8, wherein the sun-visor body is of approximately rectangular contour.

10. The sun visor of claim 3, wherein the tongue-like extension is oriented generally parallel to the pin.

11. The sun visor of claim 9, wherein a tongue like extension is carried by the upper part extends from the upper part toward and over the one side surface of the lower part.

12. The sun visor of claim 11, wherein the outer surface of the lower part over which the tongue-like extension extends has a step-shaped recess which generally corresponds in shape, dimensions and thickness to the shape, dimensions and thickness of the tongue-like extension, whereby when the upper and lower parts are displaced together and the tongue-like extension moves in the recess, the corresponding one side of the sunvisor body in which the tongue-like extension is received is generally flattened.

13. The sun visor of claim 1, wherein the upper part of the visor body is comprised of a plastic injection molding and the lower part of the visor body is comprised of a cushioning body including a reinforcement insert incorporated therein and at least the one pin receiver incorporated therein.

14. The sun visor of claim 12, wherein the upper part of the visor body comprises a mounting receiver for the mounting shaft, the tongue-shaped extension and the pin.

15. The sun visor of claim 14, wherein the upper part further comprises an outer support shaft at the one longitudinal edge zone and spaced along that edge zone from the mounting shaft mounting receiver and being integral with the upper part.

16. The sun visor of claim 1, wherein the upper part includes a recess on one surface thereof, a source of light supported in the recess and means for supplying electric current to the light source, and a lens covering the light source at the recess; the lower part supporting a mirror thereon at a location relatively near to the source of light and to the upper part.

17. The sun visor of claim 16, wherein the lower part has a recess in which the mirror is supported.

* * * * *